US008929686B2

(12) United States Patent
Evevsky et al.

(10) Patent No.: US 8,929,686 B2
(45) Date of Patent: Jan. 6, 2015

(54) METHOD AND SYSTEM FOR DETERMINISTIC DOCUMENT QUALITY ASSURANCE

(75) Inventors: Nick Evevsky, Webster, NY (US); John E. Bergeron, Fairport, NY (US); Mark Dudley, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1402 days.

(21) Appl. No.: 12/427,342

(22) Filed: Apr. 21, 2009

(65) Prior Publication Data

US 2010/0266163 A1 Oct. 21, 2010

(51) Int. Cl.
G06K 9/54 (2006.01)
G06K 9/03 (2006.01)
(52) U.S. Cl.
CPC ..................................... G06K 9/036 (2013.01)
USPC .......................................................... 382/305
(58) Field of Classification Search
None
See application file for complete search history.

(56) References Cited

U.S. PATENT DOCUMENTS

| 4,521,096 A | 6/1985 | Suganuma et al. |
| 5,384,863 A | 1/1995 | Huttenlocher et al. |
| 6,327,388 B1 * | 12/2001 | Zhou et al. ..................... 382/204 |
| 6,606,395 B1 | 8/2003 | Rasmussen et al. |
| 6,608,932 B1 | 8/2003 | Rasmussen et al. |
| 7,131,061 B2 * | 10/2006 | MacLean et al. ............. 715/210 |
| 7,397,584 B2 | 7/2008 | Harrington |
| 7,466,873 B2 | 12/2008 | Eschbach et al. |

* cited by examiner

*Primary Examiner* — Chan Park
*Assistant Examiner* — Mark Roz
(74) *Attorney, Agent, or Firm* — Fay Sharpe LLP

(57) ABSTRACT

A method and system for automating quality assurance for one or more documents, including a repository configured for electronically storing a plurality of forms; a computing subsystem for: accessing at least one of the plurality of forms, and selectively encoding the at least one of the plurality of forms with at least one electronic mark to obtain at least one encoded document with the at least one electronic mark; a document processing subsystem for: both scanning a print corresponding with the at least one encoded document and detecting the at least one electronic mark, and for: (a) generating a first bitmap from the at least one encoded document, (b) using the at least one electronic mark to generate a second bitmap from a form related document retrieved from the form repository, and (c) comparing the first and second bitmaps to determine if the first and second bitmaps substantially match.

20 Claims, 2 Drawing Sheets

METHOD AND SYSTEM FOR DETERMINISTIC DOCUMENT QUALITY ASSURANCE

BACKGROUND

1. Field of the Related Art

The present disclosure relates to document processing services, such as printing systems, and more particularly, to a method and system for automating quality assurance for one or more documents.

2. Background of the Related Art

In a conventional reproduction device, a document or image is scanned by a scanner which converts the light reflected from the document into electrical charges representing the light intensity from predetermined areas (pixels) of the document. The pixels of image data are processed by an image processing system which converts the pixels of image data into signals which can be utilized by the digital reproduction machine to recreate the scanned image. In other words, the image processing system provides the transfer function between the light reflected from the document to the mark on the recording medium.

One measure of the performance of a reproduction machine is how well the copy matches the original. Copy quality can be measured in many different ways. One way is to look at the characteristics of the reproduced image. An example of such a characteristic for determining the quality of the reproduced image is the contrast of the image. The contrast of an imaged (copied) document is one of the most commonly used characteristics for measuring quality since contrast provides a good overall assessment of the image's quality. However, visual quality assurance can be cumbersome and expensive.

Furthermore, electronic documents, such as those created using many document and/or word processing applications, generally have several layers of data. Each layer in the document, termed a "document layer," contains some information related to the document or its contents. For example, the text seen by an end user creating, editing, or viewing a document may be represented in one layer of a document. Another layer may contain some of the drawings and/or figures that are part of the document. Finally, a third layer may contain the background over which the text and drawings are displayed. A layer may be changed without requiring any change in other layers associated with the document.

However, in addition to the layers described in the example above, a document may also contain "invisible layers." These invisible layers may contain data pertaining to the document or its contents rather than actual document content that is seen by users. Such data may be referred to as glyphs. Glyphs are graphical indicia that are used to encode digital information to print duplicated versions of a digital image on a single document. Glyphs and encoding of layers are known in the prior art.

For example, U.S. Pat. No. 7,397,584 to Harrington, which issued on Jul. 8, 2008, describes a printed image that can be redundantly encoded by printing a visible image by using a colorant with a luminance that contrasts with that of the output sheet and printing a redundant image using a colorant with a luminance that varies only slightly from that of the output sheet. Accordingly, the visible image can be easily read by a user while the redundant image is substantially invisible to the human eye at normal-reading distances, yet capable of being captured by a conventional digital scanner. In one aspect, redundantly encoded images may be printed on a white background, with visible images printed in black text and redundant images printed in blue in content regions of the visible image and in yellow in its background regions.

Therefore, during the process of scan capturing documents, scanned images are traditionally verified by having the document owner or scan operator look at each document image as part of a quality assurance (QA) process. In addition, invisible layers may be added to a document for improving scanning functionality. Nevertheless, visual quality assurance is a cumbersome, error prone, and expensive process, and glyphs are highly visible and thus, they often detract from the visual appearance of the document.

SUMMARY

The present disclosure provides a system for automating quality assurance for one or more documents, the system comprising: a repository configured for electronically storing a plurality of forms; a computing subsystem, communicating with the repository, for: accessing at least one of the plurality of forms in the repository, and selectively encoding the at least one of the plurality of forms with at least one electronic mark to obtain at least one encoded document with the at least one electronic mark indicating an attribute of the at least one encoded document; a document processing subsystem, communicating with the repository, for both scanning a print corresponding with the at least one encoded document and detecting the at least one electronic mark, the document processing subsystem, responsive to detecting the at least one electronic mark, (a) generating a first bitmap from the at least one encoded document, (b) using the at least one electronic mark to generate a second bitmap from a form related document retrieved from the form repository, and (c) comparing the first and second bitmaps to determine if the first and second bitmaps substantially match.

The present disclosure also provides a method for automating quality assurance for one or more documents, the method comprising: electronically storing a plurality forms in a repository; using a computing subsystem to (1) access at least one of the plurality of forms in the repository, and (2) selectively encode the at least one of the plurality of forms with at least one electronic mark to obtain at least one encoded document with the at least one electronic mark indicating an attribute of the at least one encoded document; scanning a print corresponding with the at least one encoded document and detecting the at least one electronic mark; and responsive to the scanning step, (1) generating a first bitmap from the at least one encoded document, (2) using the at least one electronic mark to generate a second bitmap from a form related document retrieved from the form repository, and (3) comparing the first and second bitmaps to determine if the first and second bitmaps substantially match.

The present disclosure also provides a computer-readable medium which stores programmable instructions configured for being executed by at least one processor for performing the methods described herein according to the present disclosure. The computer-readable medium can include flash memory, CD-ROM, a hard drive, etc.

BRIEF DESCRIPTION OF THE DRAWINGS

Various embodiments of the present disclosure will be described herein below with reference to the figures wherein.

DETAILED DESCRIPTION

Figure 1:
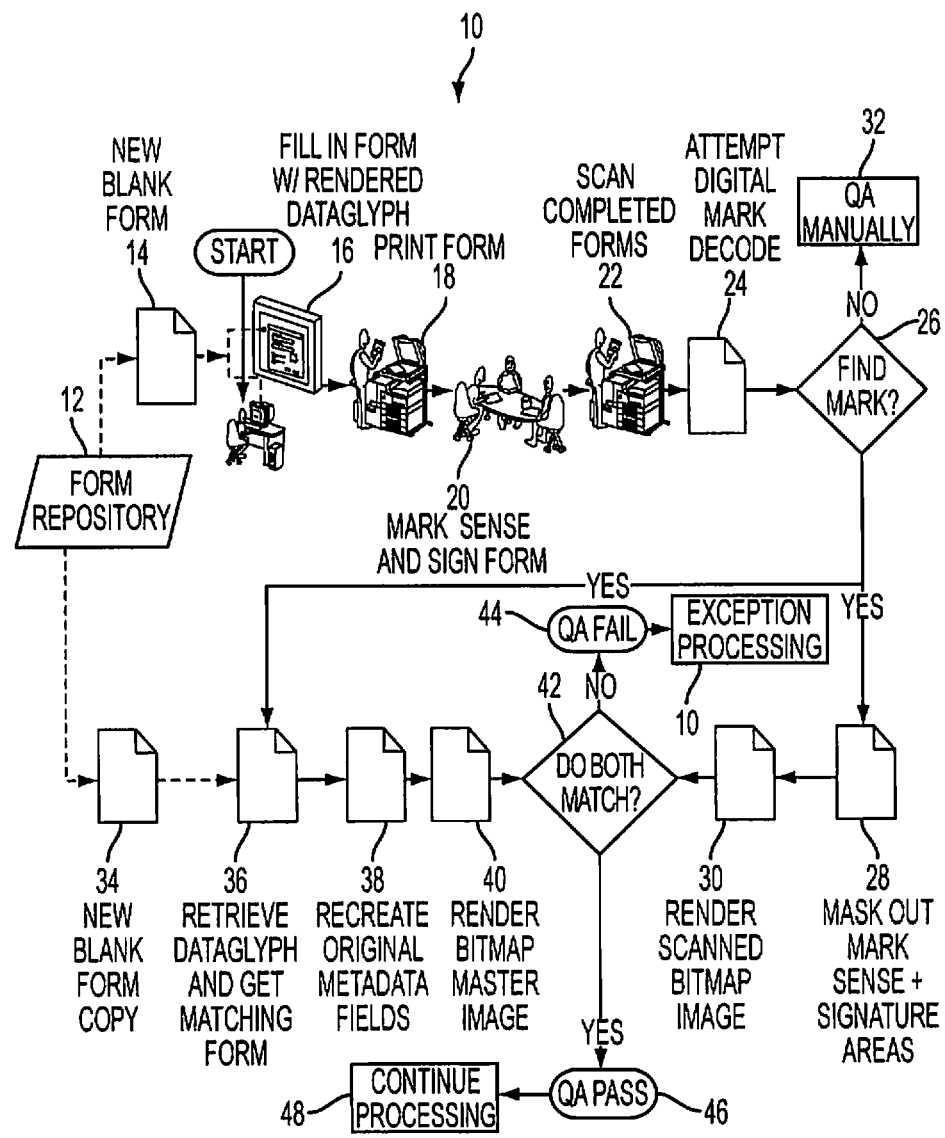
FIG. 1 is a schematic diagram of a deterministic quality assurance system, in accordance with the present disclosure.

It would be useful to provide a means for automating quality assurance for one or more documents since current printing systems lack the capability to immediately and effectively verify the accuracy of one or more scanned documents and/or images. The present disclosure is intended to overcome the drawbacks of other methods by providing for automating quality assurance for one or more documents and/or images.

The present disclosure proposes a manner of implementing quality assurance for the class of user created documents such as forms and contracts, in a more automated and predictable manner. The present disclosure further proposes that for documents that are created electronically, the user is aware of what should be contained in the scanned image because the user is aware of exactly what was printed on the original paper form, which was later scanned.

This proposed automated quality assurance system may be broken down as follows:

(1) Before printing, for every new contract or form, a digital mark (such as a "DATAGLYPH®") is inserted on all printed pages that contain or point to the form type and additional variable data enclosed within the document. DATAGLYPH® technology is a technology for encoding machine readable data onto paper documents or other physical media. They encode information into thousands of tiny, individual glyph elements. Each element consists of a small 45 degree diagonal line, as short as 1/100th of an inch or less, depending on the resolution of the printing and scanning that is used. Each one represents a single binary 0 or 1, depending on whether it slopes to the left or right. Sequences of these can be used to encode numeric, textual or other information. The individual glyphs are grouped together on the page, where they form unobtrusive, evenly textured gray areas, like halftoned pictures. One of the reasons for using diagonal glyph elements is because research has shown that the patterns that they form when massed together are not visually distracting.

(2) Print and optionally add "Mark Sense" additions to the document and possible signature to signature block area. The term "Mark Sense" was a trade name used by IBM for electrographic forms and systems. It has since come to be used as a generic term for any technology allowing marks made using ordinary writing implements to be processed, encompassing both optical mark recognition and electrographic technology, because the user of a mark-sense form cannot generally tell if the marks are sensed electrically or optically. The term "mark sense" is not generally used when referring to technology that distinguishes the shape of the mark; the general term optical character recognition is generally used when mark shapes are distinguished.

(3) Scan capture all pages.

(4) Decode the digital mark on each page image.

(5) From the encoded digital mark data, recreate a separate digital original document at the scan resolution.

(6) Align and compare the recreated original with the scanned page. If both are the same, the image quality assurance (QA) is acceptable.

In addition, certain areas such as signature boxes and "mark sense" areas may be excluded from the comparison and processed separately. The method of the present disclosure does not require the use of cover sheets since all information is encoded within each document.

The present disclosure further proposes a more accurate method of quality assurance since quality assurance has been typically performed with human labor. Such conventional process is monotonous and error prone. The unfortunate reality is that the user does not discover that a mistake has been made until the original document has been filed away or even destroyed. As a result, the present disclosure describes a process which automates quality assurance for a subset of documents that are created by a customer utilizing customer templates.

Prior to describing the present disclosure in further detail, it will first be helpful to define various terms that will be used throughout the following discussion. For example:

The term "print" is overloaded to mean sending the document to the printer through any one of a multitude of ways. Moreover, the term "printer" can refer to any device that accepts text and graphic output from any type of computing device and transfers the information to any printable medium. A "printer" can refer to any type of xerographic, solid ink, liquid ink, cut sheet or web-based device used to print onto a wide array of printable media. The term "printer" as used herein encompasses any apparatus, such as a digital copier, bookmaking machine, facsimile machine, multi-function machine, etc. which performs a print outputting function for any purpose.

As used herein, "print job" is not limited to a particular electronic format, such a bitmap, but can include any suitable format including PDF, word processor formats, rich text (RTF), etc., as will be appreciated by those skilled in the art.

The term "repository" can refer to storage. The term "storage" can refer to data storage. "Data storage" can refer to any article or material (e.g., a hard disk) from which information is capable of being reproduced, with or without the aid of any other article or device. "Data storage" can refer to the holding of data in an electromagnetic form for access by a computer processor. Primary storage is data in random access memory (RAM) and other "built-in" devices. Secondary storage is data on hard disk, tapes, and other external devices. "Data storage" can also refer to the permanent holding place for digital data, until purposely erased. "Storage" implies a repository that retains its content without power. "Storage" mostly means magnetic disks, magnetic tapes and optical discs (CD, DVD, etc.). "Storage" may also refer to non-volatile memory chips such as flash, Read-Only memory (ROM) and/or Electrically Erasable Programmable Read-Only Memory (EEPROM).

The term "computing subsystem" may refer to any type of programmable machine, such as a computer, where the programmable machine can execute a programmed list of instructions and respond to new instructions that it is given. The term "computing subsystem" may also refer to a machine for performing calculations automatically or to a machine that manipulates data according to a list of instructions or to a programmable device that performs mathematical calculations and logical operations, especially one that can process, store and retrieve large amounts of data very quickly. The term "computing subsystem" may also refer to any type of device that stores and processes information, where the information is stored internally or externally either temporarily or permanently.

The term "electronic mark" may refer to a data glyph, such as a DATAGLYPH®, a magnetic ink, a bar code, and/or a gloss mark. Data glyphs and bar codes are used extensively in industry for embedding information within printed documents, soft documents, and on products. These data glyphs and bar codes can be scanned to retrieve a variety of information. For example, a document may be encoded with a data glyph or bar code which, when read by a computer, or document processing subsystem (such as a MFD) identifies the location at which a soft copy of the document may be retrieved, thereby allowing a user to retrieve and edit the document or verify the accuracy of a scanned document.

The term "document" is a generic term for any piece of paper including information, the information being text and/or images or a set of information designed and presented as an individual entity.

The term "document processing subsystem" may refer to a multi-functional device (MFD). The term "MFD" is defined below with reference to FIG. 1.

The term "bitmap" may refer to any type of memory organization or image file format used to store digital images, such as standardized compressed bitmap files, including, but not limited to, GIF, PNG, TIFF, and JPEG files.

Embodiments will be described below while referencing the accompanying figures. The accompanying figures are merely examples and are not intended to limit the scope of the present disclosure.

The following is a detailed description of the drawings illustrating the present disclosure. In this description, as well as in the drawings, like referenced numbers represent devices, circuits, or equivalent circuits which perform the same or equivalent functions. While the present disclosure is described in connection with a preferred embodiment thereof, it is understood that it is not intended to limit the disclosure to that embodiment. On the contrary, it is intended to cover all alternatives, modifications, and equivalents as may be included within the spirit and scope of the present disclosure as defined by the appended claims.

With reference to FIG. 1, there is presented a schematic diagram of a deterministic quality assurance system, in accordance with the present disclosure.

The system 10 includes a form repository 12, a first new blank form 14, a workstation 16, a printer 18, a mark sense and sign function 20, a scanner 22, a decode digital mark function 24, a mark finder 26, a mask out function 28, a first bitmap 30, quality assurance check 32, a second new blank form 34, a retrieve glyph function 36, a recreate original metadata field 38, a second bitmap 40, a match comparison 42, a quality assurance 44, a quality assurance pass 46, and a continued procession function 48.

The following steps briefly describe the sequence of FIG. 1.

Step 1: Form Repository: This is the location where "Form Masters" are stored.

Step 2: New Blank Form: This is an instance of a new form.

Step 3: Start: This is the beginning of the process where the new form is created, filled in, and saved.

Step 4: Print Form: This is where the new form is printed to paper.

Step 5: Mark Sense and Sign Form: This is where the form has any required boxes checked and is also signed.

Step 6: Scan Completed Form: This is where the final form is scan captured.

Step 7: Attempt Mark Sense Decode: This is where the scanned image file is examined for any digital marks like a barcode or a data glyph, such as a DATAGLYPH®.

Step 8: This is a determination step: Were any Digital Marks found (Y/N)?

Step 9: Mask out Mark Sense and Signature areas: This is a step to remove variable information.

Step 10: Render a final scanned bitmap image: This is prepared for final comparison testing.

Step 11: Manual Quality Assurance continued workflow.

Step 12: New Blank Form: This is an instance of a new form. The same image as seen in Step 2.

Step 13: A request for the form is completed.

Step 14: The new image which includes the step 12 image plus the recreated form data held within the Digital Mark.

Step 15: Render a final scanned bitmap image: This is for final comparison testing.

Step 16: Check to see if both bitmap imaged match. Do they match?

Step 17: If QA fails, then go to step 20, which is "Exception Processing."

Step 18: If QA passes, then go to step 19, which is "Continue Processing."

Concerning DATAGLYPH® technology, it allows ordinary business documents to carry thousands of characters of information hidden in these unobtrusive gray patterns that can appear as backgrounds, shading patterns or conventional graphic design elements. Often, their presence goes completely unnoticed.

DATAGLYPH® areas can be printed on a document as part of its normal printing process. The information to be put in dataglyphs is encoded as a sequence of individual glyphs, and these can be printed either directly by the encoding software (for instance, by computer laser printer) or via a conventional printing process, such as offset.

The glyphs are laid down on a finely spaced rectangular grid so that the area is evenly textured. In addition, each glyph area contains an embedded synchronization lattice or "skeleton," which is a repeating, fixed pattern of glyphs which marks the boundaries of the glyph area and serves as a clocking track to improve the reliability of reading.

Before data is placed into the synchronization frame, it's grouped into blocks of a few dozen bytes and error correcting code is added to each block. The amount of error correction to be used is chosen by the application, depending on the expected quality of the print-scan cycle. Higher levels of error correction increase the size of the glyph area needed for a given amount of data, but improve the reliability with which the data can be read back. This can be very important in environments where there's a high level of image noise (for example, fax) or where the documents are subjected to rough handling.

As a final step, the bytes of data are randomly dispersed across the glyph area, so that if any part of the glyph area on the paper is severely damaged, the damage to any individual block of data is slight, and thus easy for the error correcting code to recover. Together, error correction and randomization provide very high levels of reliability, even when the glyph area is impaired by ink marks, staples and other kinds of image damage.

However, DataGlyph™ technology may not be the only technology used. For example, Xerox GLOSSMARK® technology may be used, which is a "watermarking" technology that exhibits a special visual effect by creating different levels of gloss within an image. The GLOSSMARK® is an image or pattern embedded in an existing image without the need for special toners or paper. Similar to traditional watermarks, an embedded GLOSSMARK® can be easily observed without the assistance of special devices, yet cannot be deleted or reproduced by conventional scanning or copying. GLOSSMARK® technology combines a visually striking gloss image with a high quality color image in a seamless fashion, and allows both images to be easily viewed with little interference.

In addition, concerning the workstation 16, it may be connected to a network of workstations. The network may be, for example a Local Area Network (LAN), a Wide Area Network (WAN), or the Internet. In some embodiments consistent with the present disclosure, information sent over network may be encrypted to ensure the security of the data being transmitted.

Printer 18 and scanner 22 are connected to the network. The scanner and printer may be an MFD. The term "MFD" can refer to any machine that connects to either a computing device and/or network and performs one or more of the following functions: print, scan, copy, and/or fax. Digital copiers, fax machines, printers, and scanner combinations are all examples of MFDs. The term "MFD" can further refer to any hardware that combines several functions in one unit. For instance, an MFD can be a standalone printer or any type of standalone machine/device/apparatus/component. For example, an MFD can be one or more personal computers (PCs), a standalone printer, a standalone scanner, a mobile phone, an MP3 player, audio electronics, video electronics, GPS systems, televisions, recording and/or reproducing media (such as CDs, DVDs, camcorders, cameras, etc.) or any other type of consumer or non-consumer analog and/or digital electronics. Such consumer and/or non-consumer electronics can apply in any type of entertainment, communications, home, and/or office capacity. Thus, the term "MFDs" can refer to any type of electronics suitable for use with a circuit board and intended to be used by a plurality of individuals for a variety of purposes.

MFDs disclosed herein include both those that are "connected" and those that are "unconnected," where connected and unconnected refer to physical connections. An "unconnected" MFD does not have access to a network (e.g., the Internet). A "connected" MFD is normally connected via an Ethernet card or the like to a network. In the present embodiments, the MFD may be an unconnected MFD that is in operative communication with a wireless device, the wireless device being able to access a network. A connection between the multi-function device and the wireless device is made through a two-way communication channel located on the multi-function device.

Additionally, in some embodiments, the printer 18 and scanner 22 may be connected directly to computing device and/or server and/or workstation 16. Printer 18 may be used to print documents containing encoded information, such as two-dimensional bar codes, in accordance with some methods for preserving and maintaining document integrity. In some embodiments, the information contained in the document, as well as meta-data information associated with the document, such as indexing information, content descriptions, access lists, times of creation, editing, etc., may be encoded and stored as a document layer.

In some embodiments, the encoded information may be printed on paper or other media using a two-dimensional bar code, or other machine-readable formats. In some embodiments, printer 18 may be a color printer capable of printing encoded information in the form of multi-colored two-dimensional bar codes. Documents stored on computing device, server, or on removable media may be printed on printer 18. Scanner 22 may be used to scan documents, including printed documents containing encoded information, in accordance with some methods of preserving and maintaining document integrity.

Both printer 18 and scanner 22 may contain automatic document feeders to allow batch processing of documents. In some embodiments, scanner 22 may be capable of reading machine-readable code printed on documents. In some embodiments, documents scanned using scanner 22 may be stored on computing device and/or server and/or workstation 16 for additional processing.

In some embodiments, the electronic document (e.g., forms 14, 34) may have been created using document processing software, and an application executing steps in a method for preserving and maintaining document integrity may be embedded or linked to the document processing system, so that the execution of a "print" command on a document from within the document-processing system may invoke the embedded or linked application according to embodiments of the present disclosure. For example, a user who wants to print an electronic document may be provided with a menu choice that allows the user to preserve layer data in the printed form of the document. If a user elects to preserve layer data in the printed document, the "print" command in the word processing system may invoke the linked application to preserve and maintain the integrity of the document prior to its actual printing. Furthermore, responsive to detecting the at least one electronic mark, the document processing subsystem may: (a) generate a first bitmap from the at least one encoded document, (b) use the at least one electronic mark to generate a second bitmap from a form related document retrieved from the form repository, and (c) compare the first and second bitmaps to determine if the first and second bitmaps substantially match.

Additionally, not all forms may include a mark or a glyph. In one instance, the user may be able to select which of the one or more documents includes a mark or a glyph. In another instance, a software program may be enabled that automatically adds a mark or a glyph to a certain type of document each and every time such a document is created by a user. In another instance, a mark or a glyph may be user-specific. In other words, when a specific user accesses an MFD, one or more documents that the user accesses may be incorporated by a mark or glyph automatically. Thus, the encoding may be selective based on one or more factors and/or attributes (such as user access, user time of access, MFD-specific access, document-type, document content, document access right, etc.).

Moreover, any type of mark or combination of types of marks may be used. In other words, several marks may be incorporated in different locations of the document. Also, the entire document may include tiny marks. Also, several different types of marks may be used on each document. For example, a watermark and a DATAGLYPH® and a GLOSSMARK® may be used on one document. The types of marks and/or glyphs may be selected by one or more users or may be generated automatically based on the type of document or the content of a document. In other words, software embedded within the MFDs can selectively incorporate any type of mark and/or glyph in a dynamic and real-time manner in accordance with attributes of the document and/or attributes of the user. Additionally, a plurality of repositories may be provided, where each repository includes different forms based on MFD and/or user attributes (such as access capabilities). Each repository may require a different glyph and/or mark for verification/authorization purposes.

Figure 2:
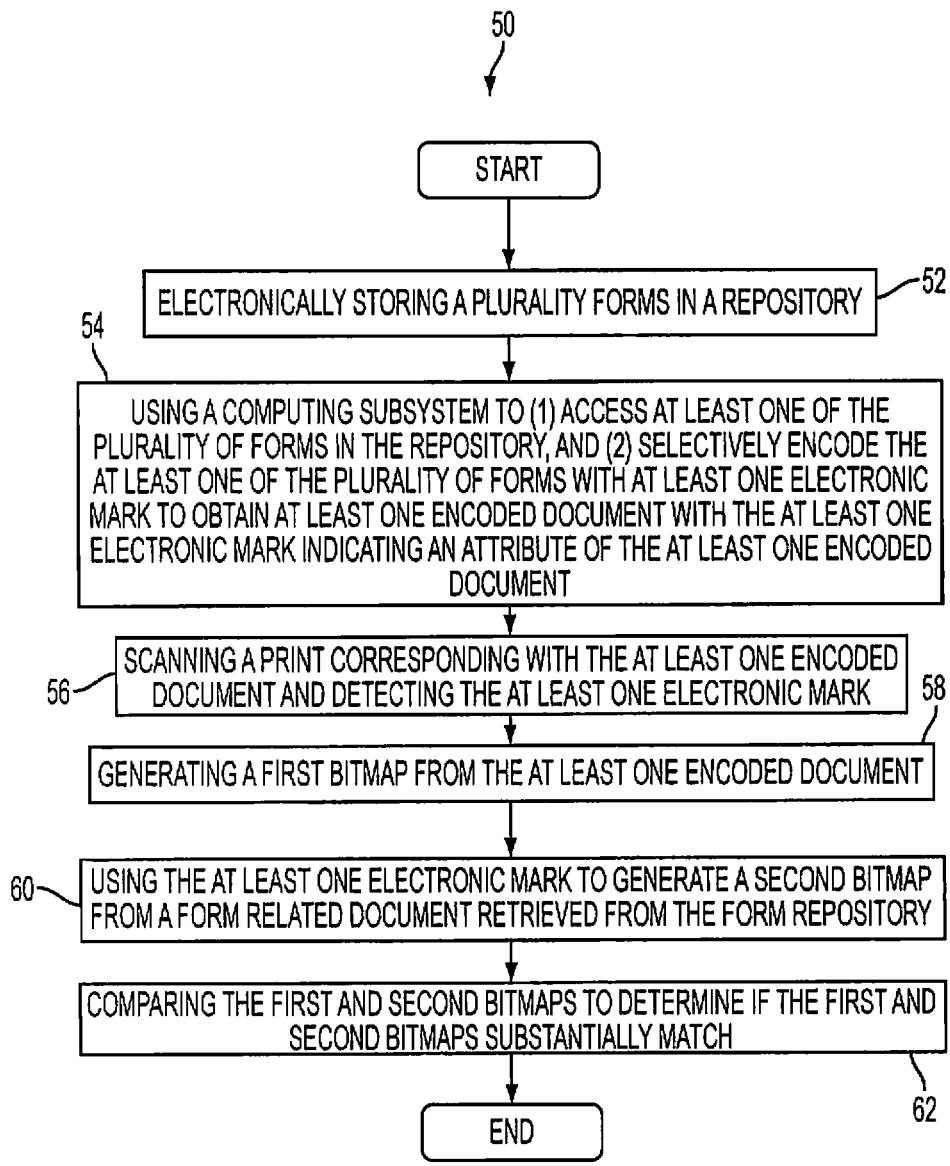
FIG. 2 is a flowchart illustrating the process flow of a deterministic quality assurance system, in accordance with the present disclosure.

With reference to FIG. 2, there is presented a flowchart illustrating a process flow of a deterministic quality assurance system, in accordance with the present disclosure.

The process flow 50 includes the following steps. In step 52, the system electronically stores a plurality forms in a repository. In step 54, a computing subsystem is used to (1) access at least one of the plurality of forms in the repository, and (2) selectively encode the at least one of the plurality of forms with at least one electronic mark to obtain at least one encoded document with the at least one electronic mark indicating an attribute of the at least one encoded document. In step 56, the system scans a print corresponding with the at least one encoded document and detecting the at least one electronic mark. In step 58, a first bitmap is generated from the at least one encoded document. In step 60, the system uses at least one electronic mark to generate a second bitmap from a form related document retrieved from the form repository. In step 62, a comparison is made between the first and second bitmaps to determine if the first and second bitmaps substantially match. The process then ends.

Further, methods consistent with embodiments of the present disclosure may conveniently be implemented using program modules, hardware modules, or a combination of program and hardware modules. Such modules, when executed, may perform the steps and features disclosed herein, including those disclosed with reference to the exemplary flow chart shown in FIG. 2. The operations, stages, and procedures described above and illustrated in the accompanying drawings are sufficiently disclosed to permit one of ordinary skill in the art to practice the present disclosure. Moreover, there are many computers and operating systems that may be used in practicing embodiments of the present disclosure and, therefore, no detailed computer program could be provided that would be applicable to these many different systems. Each user of a particular computer is aware of the language, hardware, and tools that which are most useful for that user's needs and purposes.

The above-noted features and aspects of the present disclosure may be implemented in various environments. Such environments and related applications may be specially constructed for performing the various processes and operations of the present disclosure, or they may include a general-purpose computer or computing platform selectively activated or reconfigured by program code to provide the functionality. The processes disclosed herein are not inherently related to any particular computer or other apparatus, and aspects of these processes may be implemented by any suitable combination of hardware, software, and/or firmware. For example, various general-purpose machines may be used with programs written in accordance with teachings of the present disclosure, or it may be more convenient to construct a specialized apparatus or system to perform the required methods and techniques.

The present disclosure proposes an alternative method that takes advantage of document quality assurance systems relating to printing jobs on, for example, MFDs in order to make the process of printing and scanning simple and as streamlined as possible to provide for an efficient user experience. The concept of using document quality assurance systems is a general concept in that it can be used for applications other than printers by any service provider. For example, service providers could use any type of printer and/or MFD and/or electronic device to achieve the desired results of the present disclosure. Also the printing system of the present disclosure makes it easier for information technology (IT) groups and/or service providers to manage/control/operate the printing environment for their clients.

A service provider can be any entity that develops, offers, controls, manages, owns, alters and/or sells software and/or hardware products. A service provider can be any entity that performs one or more tasks on one or more pre-existing MFDs, which may or may not be controlled or owned by the service provider. For example, the entity can offer a service with an existing software package and/or with any type of existing Internet-based service through the Internet. In other words, a service provider need not own or provide the MFDs. The MFDs may be owned or provided by any third party not related or associated with the service provider. In the present disclosure, it is contemplated that the entity (such as a service provider) can offer any type of service and/or product to optimize pre-existing, pre-owned MFDs by referring potential customers to an Internet website or a store that may or may not be associated with printing-related services and/or products. The term "entity" can refer to anything that may exist as a discrete and/or distinct unit that owns, operates, manages, and/or controls one or more of a plurality of machines (such as MFDs). For example, the term "entity" may include the term "company."

In summary, the present disclosure proposes a method for automatically determining scanned document quality for documents of known type, such as forms. Currently, scanned document quality assurance is a manual and subjective process where a person views the image of a scanned document to validate whether it is "good enough." The proposed method uses a form marked with a special identifying mark or glyph. After the user annotates and scan captures the document the digital mark would be read. A digital equivalent of the document at the same resolution of the scanned document would be generated and if the two images match within a tolerance then the scanned image passes the quality assurance step. The process would thus detect missing pages or bent corners or stained areas.

The present disclosure also includes as an additional embodiment a computer-readable medium which stores programmable instructions configured for being executed by at least one processor for performing the methods described herein according to the present disclosure. The computer-readable medium can include flash memory, CD-ROM, a hard drive, etc.

Embodiments of the present disclosure may be implemented as computer-readable media that include program instructions or program code for performing various computer-implemented operations. The program instructions may be those specially designed and constructed for the purposes of the present disclosure, or they may be of the kind well known and available to those having skill in the computer software arts. Examples of program instructions include, for example, machine code, such as produced by a compiler, and files containing a high-level code that can be executed by the computer using an interpreter.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for automating quality assurance in the printing of a document, the system comprising:
   a repository configured for electronically storing a plurality of forms;
   a computing subsystem, communicating with the repository, for accessing at least one form in the repository including empty areas intended for variable information markings, and selectively encoding the at least one form with at least one electronic mark to obtain at least one encoded document with the at least one electronic mark indicating an attribute of the at least one encoded document;
   a document processing subsystem, communicating with the repository, for both scanning a print corresponding with the at least one encoded document and detecting the at least one electronic mark, wherein the document processing subsystem, responsive to detecting the at least one electronic mark, is adapted to:

mask out the variable information marked in the areas of the scanned document, after masking out the mark sense areas, generate a first bitmap of the scanned copy without the markings, use the at least one electronic mark to access the form repository, recreate a copy of the form with original data fields, generate a second bitmap from the second form, and compare the first and second bitmaps to determine if the scanned document substantially matches the original form.

2. The system according to claim 1, wherein the attribute of the at least one encoded document includes one of document type and document content.

3. The system according to claim 1, wherein the at least one electronic mark is one of or a combination of: a data glyph, a magnetic ink, a bar code, and a gloss mark.

4. The system according to claim 1, in which the variable information sections includes mark sense and signature areas, wherein the generating of the first bitmap includes masking out the mark sense and signature areas.

5. The system according to claim 1, wherein the generating of the second bitmap includes recreating original metadata fields in the form related document.

6. The system according to claim 5, wherein the original metadata field are provided to a new blank form copy.

7. The system according to claim 1, in which the plurality of forms includes at least two forms, wherein the at least one electronic mark is omitted from one of the at least two forms.

8. The system according to claim 7, wherein each one of the at least two forms is scanned to determine if a bitmap is to be generated.

9. The system according to claim 1, wherein responsive to determining that the scanned document and the recreated form do not substantially match, performing exception processing on form.

10. A method for automating quality assurance in the printing of a document, the method comprising:

electronically storing a plurality forms in a repository;

using a computing subsystem to (1) access from the repository at least one of the plurality of forms including empty variable information sections intended for markings, and (2) selectively encode the at least one of the plurality of forms with at least one electronic mark to obtain at least one encoded document with the at least one electronic mark indicating an attribute of the at least one encoded document;

scanning a print corresponding with the at least one encoded document and detecting the at least one electronic mark;

removing markings placed in the variable information sections of the scanned document;

generating a first bitmap from the print of the at least one encoded document;

using the at least one electronic mark to access the form in the repository;

recreating a copy of the form with original data fields;

generating a second bitmap from the recreated form; and comparing the first and second bitmaps to determine if the scanned document substantially matches the form.

11. The method according to claim 10, wherein the attribute of the at least one encoded document includes one of document type and document content.

12. The method according to claim 10, wherein the at least one electronic mark is one of or a combination of: a data glyph, a magnetic ink, a bar code, and a gloss mark.

13. The method according to claim 10, wherein the variable information sections includes mark sense and signature areas, wherein the generating of the first bitmap includes masking out the mark sense and signature areas.

14. The method according to claim 10, wherein the generating of the second bitmap includes recreating original metadata fields in the form related document.

15. The method according to claim 14, wherein the original metadata field are provided to a new blank form copy.

16. The method according to claim 10, in which the plurality of forms includes at least two forms, wherein the at least one electronic mark is omitted from one of the at least two forms.

17. The method according to claim 16, wherein each one of the at least two forms is scanned to determine if a bitmap is to be generated.

18. The method according to claim 10, wherein responsive to determining the lack of a substantial match exception processing is performed on the at least one of the plurality of forms.

19. A non-transitory computer-readable medium storing programmable instructions configured for being executed by at least one processor for automating quality assurance in the print of a document, the computer-readable medium adapted to:

electronically store a plurality forms in a repository;

using a computing subsystem to (1) access from the repository at least one of the plurality of forms including empty variable information sections intended for markings;

selectively encode the at least one of the plurality of forms with at least one electronic mark to obtain at least one encoded document with the at least one electronic mark indicating an attribute of the at least one encoded document;

scan a print corresponding with the at least one encoded document and detecting the at least one electronic mark;

responsive to the scanning, mask out markings placed in the variable information sections;

generate a first bitmap from the print of the at least one encoded document, use the at least one electronic mark to access the form in the repository;

recreate a copy of the form including original data fields;

generate a second bitmap from the recreated form; and, compare the first and second bitmaps to determine if the scanned copy substantially matches the form as the same document.

20. The computer-readable medium according to claim 19, wherein the generating of the second bitmap includes recreating original metadata fields in the form related document; and wherein the original metadata field are provided to a new blank form copy.

* * * * *